(12) United States Patent
Roziere et al.

(10) Patent No.: US 8,636,295 B2
(45) Date of Patent: Jan. 28, 2014

(54) SKID PLATES FOR A MOTORCYCLE

(75) Inventors: Jean-Francois Roziere, Ceyrat (FR); Claude Martinroche, Saint-Babel (FR)

(73) Assignees: Compagnie General des Etablissments Michelin, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 13/320,538

(22) PCT Filed: May 12, 2010

(86) PCT No.: PCT/EP2010/056570
§ 371 (c)(1),
(2), (4) Date: Feb. 7, 2012

(87) PCT Pub. No.: WO2010/130795
PCT Pub. Date: Nov. 18, 2010

(65) Prior Publication Data
US 2012/0133115 A1    May 31, 2012

(30) Foreign Application Priority Data

May 13, 2009    (FR) ...................................... 09 53136

(51) Int. Cl.
*B60R 19/48*    (2006.01)
*B60R 21/02*    (2006.01)

(52) U.S. Cl.
USPC ........... 280/293; 280/748; 280/755; 280/770; 293/105; 293/114

(58) Field of Classification Search
USPC ........... 280/748, 755, 288.4, 293, 304.3, 770; 180/219; 293/105, 114
See application file for complete search history.

(56) References Cited

U.S. PATENT DOCUMENTS

| | | | |
|---|---|---|---|
| 5,106,136 A | 4/1992 | Crain | |
| 6,419,039 B1* | 7/2002 | Wagner | 180/219 |
| 6,637,787 B1* | 10/2003 | Salvisberg | 293/105 |
| 7,290,781 B2* | 11/2007 | Wood | 280/304.3 |
| 7,451,994 B2* | 11/2008 | Heitner | 280/304.3 |
| 7,658,395 B2* | 2/2010 | Bagnariol et al. | 280/304.3 |
| 2004/0251657 A1 | 12/2004 | Kan et al. | |
| 2010/0244468 A1* | 9/2010 | Namiki et al. | 293/105 |

FOREIGN PATENT DOCUMENTS

| | | |
|---|---|---|
| BE | 400 206 | 2/1934 |
| DE | 20 2008 011 888 | 11/2008 |
| GB | 705 034 | 3/1954 |

* cited by examiner

*Primary Examiner* — Paul N Dickson
*Assistant Examiner* — Darlene P Condra
(74) *Attorney, Agent, or Firm* — Cozen O'Connor

(57) ABSTRACT

A two-wheel vehicle for carrying out tire grip measurements. The vehicle is equipped with three spars fitted onto one side of the vehicle, the ends of the spars forming a plane approximately parallel to the circumferential plane of the rear wheel of the vehicle and the distance between said plane and the circumferential plane of the rear wheel of the vehicle being greater than 350 mm.

11 Claims, 1 Drawing Sheet

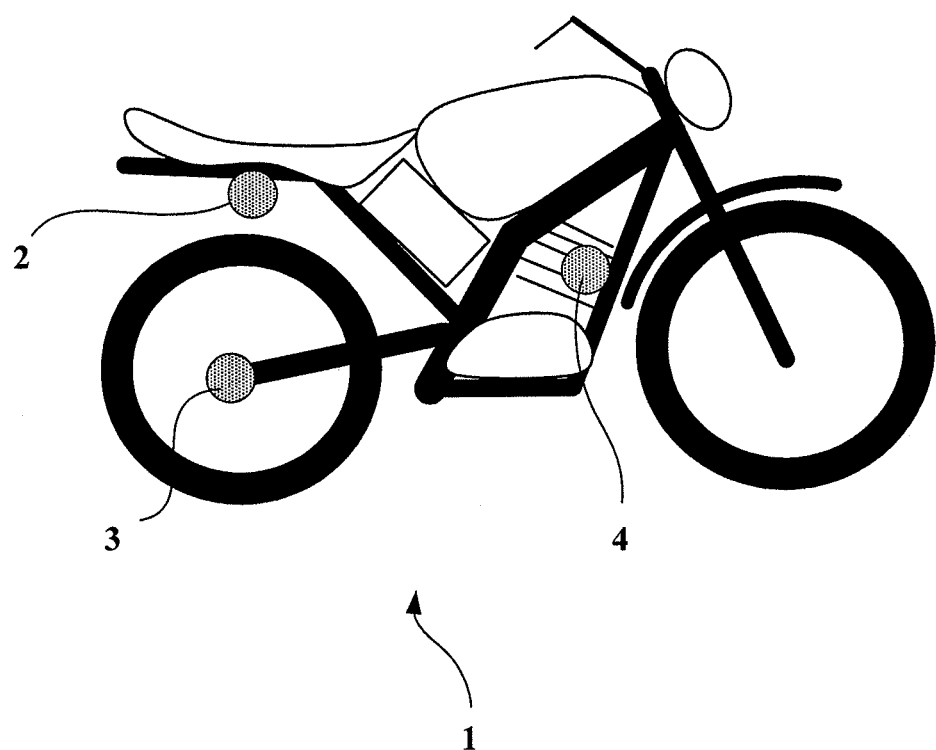

SKID PLATES FOR A MOTORCYCLE

RELATED APPLICATIONS

This is a U.S. national stage of application No. PCT/EP2010/056570, filed on May 12, 2010.

This application claims the priority of French application Ser. No. 09/53136 filed May 13, 2009, the entire content of which is hereby incorporated by reference.

FIELD OF THE INVENTION

The invention relates to a two-wheel vehicle for carrying out tire grip measurements. Although not limited to this type of application, the invention will be more particularly described with reference to a motorcycle used especially for evaluating the transverse grip of the tires with which it is equipped. The invention may apply to all types of two-wheel vehicles, whether motorized or not, such as cycles, scooters, etc. and to two-wheel vehicles used for testing longitudinal grip or many other properties.

BACKGROUND OF THE INVENTION

The circumferential direction of a tire, or longitudinal direction, is the direction corresponding to the periphery of the tire and defined by the rolling direction of the tire.

The transverse or axial direction of a tire is parallel to the rotation axis of the tire.

The radial direction is a direction cutting the rotation axis of the tire and perpendicular to said axis.

The rotation axis of a tire is the axis about which it rotates in normal use.

A radial or meridional plane is a plane which contains the rotation axis of the tire.

The circumferential median plane, or equatorial plane, is a plane which is perpendicular to the rotation axis of the tire and which divides the tire into two halves.

The design and the improvement of tires require their effectiveness, and especially their rolling behavior, to be able to be judged as objectively as possible. Motorcycle tires have one particular feature compared with other types of tire which is that they are used with a relatively high camber angle so as to allow cornering.

During cornering, the transverse grip of a tire is an important parameter that the tire designer wishes to be able to evaluate in order to improve its tires.

Although somewhat subjective, the current methods for evaluating the transverse grip of a tire consist of an assessment by a rider who is riding a two-wheel vehicle. Such methods allow tires to be classified with respect to one another.

Since the objective of these methods is to test the performance of tires, the rider is forced to ride the motorcycle at the grip limit, with a non-zero risk of exceeding this limit and therefore losing control of the vehicle, and possibly falling off it.

SUMMARY OF THE INVENTION

One object of the invention is to provide a test vehicle for carrying out measurements for evaluating the transverse grip of tires while guaranteeing enhanced protection of the rider, including in the event of a fall.

This object has been achieved according to one aspect of the invention by a two-wheel vehicle for carrying out tire grip measurements, the vehicle being equipped with at least three spars fitted onto one side of the vehicle, the ends of the spars forming a plane approximately parallel to the circumferential plane of the rear wheel of the vehicle and the distance between said plane and the circumferential plane of the rear wheel of the vehicle being greater than 350 mm.

The vehicle thus equipped prevents the rider, in the event of a fall, from being jammed beneath the vehicle and of possibly being crushed in the case of a low-speed fall or else of being dragged in a slide, jammed between the vehicle and the ground following a fall at higher speed.

Advantageously, according to an embodiment of the invention, the vehicle is equipped with at least three spars fitted onto each of its sides. The rider is thus protected whatever side the vehicle lies on in the event of a fall.

According to a preferred embodiment of the invention, at least the ends of the spars intended to come into contact with the ground in the event of a fall are made of a material having a sliding friction coefficient of less than 0.2.

The sliding friction coefficient is measured in compression on a steel cylinder, without a lubricant, with a pressure of 1.75 $N/mm^2$ and at a sliding rate of 6 m/min. The cylinder has a roughness of 2 µm.

The inventors have demonstrated that, apart from protecting the rider from being crushed owing to the weight of the vehicle, it is important for the rider to be thrown clear as quickly as possible from his position between the ground and the vehicle. By choosing a material for producing the spars that has a sliding friction coefficient of less than 0.2, it is possible for the vehicle to slide more rapidly than the rider in the event of a fall and therefore enabling him to be thrown clear as rapidly as possible.

A rider is thrown clear more rapidly when he is wearing a protective suit, usually made of leather, which has a very high sliding friction coefficient that slows down the rate at which the rider slides over the ground.

According to one advantageous embodiment of the invention, the material of which the spars are made is a nylon-6,6 polyamide.

This material, apart from its sliding friction coefficient properties, has hot dimensional stability and heat ageing resistance properties appropriate for the spars according to the invention which, during a fall, see their temperature rise because of friction. Furthermore, this material may be easily molded and machined, facilitating production of the spars.

Preferably, according to an embodiment of the invention, the spars when fitted have a length in the axial direction of the rear wheel of greater than 180 mm. Such a length makes it possible, on the one hand, to protect the rider in the event of a fall and, on the other hand, protects the vehicle, including in the case of partial wear of the spars in the event of a slide over a great distance.

According to an advantageous embodiment of the invention, when the vehicle is resting on all three spars, a first spar bears a load of greater than 70% of the total weight of the vehicle, a second spar bears a load of greater than 16% of the total weight of the vehicle and a third spar bears a load of greater than 8% of the total weight of the vehicle. Preferably, the first spar bears a load of less than 75%. More preferably, the second spar bears a load of less than 20%. Also preferably, the third spar bears a load of less than This load distribution advantageously defines a triangle, the vertices of which are the spars and inside which the center of gravity of the vehicle lies when said triangle and the center of gravity are projected onto a plane parallel to the circumferential plane of the rear wheel of the vehicle. This advantageously results, in the case of a fall, in the possibility of the vehicle being supported on these three spars not only preserving the rider's leg but also leaving the handlebars and wheels free so that the vehicle can slide more easily.

According to a preferred embodiment of the invention, the vehicle is a motorcycle.

According to this embodiment, a first spar is advantageously fitted onto the front fairing. This spar, located on the engine block, will bear a load of between 70 and 75% of the weight of the vehicle.

Again according to this embodiment, a second spar is fitted onto the rear wheel axle. This spar, located on the rear wheel, will bear a load of between 16 and 20% of the weight of the vehicle.

Again according to this embodiment, a third spar is fitted beneath the passenger saddle. This spar, located for example at the place provided for the passenger to rest his feet, will bear a load of between 8 and 11% of the weight of the vehicle.

BRIEF DESCRIPTION OF THE SINGLE DRAWING

Other advantageous details and features of the invention will become apparent from the following description of an exemplary embodiment of the invention with reference to the FIGURE, which illustrates a schematic representation of a motorcycle according to the invention.

The FIGURE has not been drawn to scale in order to make it easier to understand.

DETAILED DESCRIPTION OF THE SINGLE DRAWING

The FIGURE schematically illustrates a motorcycle 1 designed to be used for carrying out tire grip measurements. The motorcycle 1 for carrying out grip measurement tests is a "Honda" (registered trademark) 600 "CBR" (registered trademark) machine with a 120/70 ZR 17 tire on the front wheel and a 180/55 ZR 17 tire on the rear wheel.

According to the invention, the motorcycle is equipped with three spars 2, 3, 4 made of nylon-6,6 polyamide on each of its sides.

The spars 2 are fitted onto the attachment initially provided for fitting the rear passenger footrests. When the motorcycle is supported by all three spars, the load borne by the spar 2 is equal to 9.5% of the total weight of the motorcycle.

The spars 3 are fitted onto the rear wheel axle. When the motorcycle is supported by all three spars, the load borne by the spar 3 is equal to 18.5% of the total weight of the motorcycle.

The spars 4 are fitted onto the front fairing, on the engine block. When the motorcycle is supported by all three spars, the load borne by the spar 4 is equal to 72% of the total load of the motorcycle.

The spars 2, 3 and 4 were made with lengths of 160 mm, 50 mm and 50 mm respectively, so that when the motorcycle is resting on these three spars they are the only elements in contact with the ground, the distance between the plane formed by the ground, and therefore by the ends of the spars, and the circumferential plane of the rear wheel of the vehicle is equal to 392.5 mm, and therefore greater than 350 mm.

Trials were carried out with this motorcycle to simulate the test conditions during which the tire grip measurements are carried out. These trials consisted in exceeding the tire grip limits so as to cause the vehicle and the rider to fall in such a way as may occur during these tests. The test rider was a stuntman wearing a suit preventing the risk of injury.

These trials have shown that, on the one hand, the rider is protected from the weight of the motorcycle, which cannot bear on his leg, and that, on the other hand, the choice of material for producing the spars clearly ensures that the motorcycle slides more easily than the rider, who is therefore very rapidly thrown clear thereof.

This type of trial was carried out firstly on dry ground and secondly on wet ground. In both cases, the spars proved to be just as effective, especially from the point of view of sliding.

The invention claimed is:

1. A two-wheel vehicle for carrying out tire grip measurements, wherein the vehicle comprises three spars fitted onto one side of the vehicle, wherein the ends of the spars form a plane approximately parallel to the circumferential plane of the rear wheel of the vehicle and wherein the distance between said plane and the circumferential plane of the rear wheel of the vehicle is greater than 350 mm; and
   wherein, when the vehicle is resting on all three spars, a first spar bears a load of greater than 70% of the total weight of the vehicle, a second spar bears a load of greater than 16% of the total weight of the vehicle and a third spar bears a load of greater than 8% of the total weight of the vehicle.

2. The vehicle according to claim 1, wherein the vehicle is equipped with at least three spars fitted onto each of its sides.

3. The vehicle according to claim 1, wherein at least the ends of the spars adapted to come into contact with the ground in the event of a fall are made of a material having a sliding friction coefficient of less than 0.2.

4. The vehicle according to claim 3, wherein the material is a nylon-6,6 polyamide.

5. The vehicle according to claim 1, wherein the spars when fitted have a length in the axial direction of the rear wheel of greater than 180 mm.

6. The vehicle according to claim 1, wherein the vehicle is a motorcycle.

7. The vehicle according to claim 6, wherein a first spar is fitted onto the front fairing.

8. The vehicle according to claim 7, wherein a second spar is fitted onto the rear wheel axle.

9. The vehicle according to claim 8, wherein a third spar is fitted beneath the passenger saddle.

10. A two-wheel vehicle for carrying out tire grip measurements, wherein the vehicle comprises three spars fitted onto one side of the vehicle, wherein the ends of the spars form a plane approximately parallel to the circumferential plane of the rear wheel of the vehicle and wherein the distance between said plane and the circumferential plane of the rear wheel of the vehicle is greater than 350 mm,
   wherein the vehicle is a motorcycle,
   wherein a first spar is fitted onto the front fairing, and
   wherein a second spar is fitted onto the rear wheel axle.

11. The vehicle according to claim 10, wherein the vehicle comprises a passenger saddle, and a third spar fitted beneath the passenger saddle.

* * * * *